US012037916B2

(12) United States Patent
Brookes et al.

(10) Patent No.: US 12,037,916 B2
(45) Date of Patent: Jul. 16, 2024

(54) TURBINE HOUSING

(71) Applicant: Cummins Ltd., London (GB)

(72) Inventors: Matthew Brookes, Huddersfield (GB); Stephen David Hughes, Huddersfield (GB); Mark R. Holden, Huddersfield (GB)

(73) Assignee: CUMMINS LTD, London (GB)

( * ) Notice: Subject to any disclaimer, the term of this patent is extended or adjusted under 35 U.S.C. 154(b) by 0 days.

(21) Appl. No.: 18/019,006

(22) PCT Filed: Jul. 30, 2021

(86) PCT No.: PCT/EP2021/071496

§ 371 (c)(1),
(2) Date: Jan. 31, 2023

(87) PCT Pub. No.: WO2022/023569

PCT Pub. Date: Feb. 3, 2022

(65) Prior Publication Data

US 2023/0287806 A1 Sep. 14, 2023

(30) Foreign Application Priority Data

Jul. 31, 2020 (GB) ...................................... 2011956

(51) Int. Cl.
*F01D 17/16* (2006.01)
*F01D 9/02* (2006.01)
*F01D 25/24* (2006.01)

(52) U.S. Cl.
CPC ............ *F01D 25/246* (2013.01); *F01D 9/02* (2013.01); *F01D 17/16* (2013.01); *F05D 2220/40* (2013.01); *F05D 2230/642* (2013.01)

(58) Field of Classification Search
CPC ... F01D 9/02; F01D 17/16; F01D 5/32; F02C 6/12; F05D 2240/32; F05D 2260/30; F05D 2260/36; F05D 2260/39
See application file for complete search history.

(56) References Cited

U.S. PATENT DOCUMENTS 8,702,385 B2 * 4/2014 Burdgick .................. F01D 1/02 29/889.22
9,291,092 B2 * 3/2016 Sumser ................. F01D 17/167
(Continued)

FOREIGN PATENT DOCUMENTS

EP 1273760 A1 1/2003
EP 3140518 B1 7/2019
(Continued)

OTHER PUBLICATIONS

International Preliminary Report on Patentability received for PCT Patent Application No. PCT/EP2021/071496, mailed on Feb. 9, 2023, 7 pages.

(Continued)

*Primary Examiner* — Brian P Wolcott
*Assistant Examiner* — Maxime M Adjagbe
(74) *Attorney, Agent, or Firm* — Faegre Drinker Biddle & Reath LLP

(57) ABSTRACT

There is provided an assembly for a turbocharger, the assembly comprising a turbine housing and a nozzle ring, wherein one of the turbine housing and the nozzle ring comprises a tongue and the other of the turbine housing and the nozzle ring comprises a corresponding slot, the tongue and slot being configured to engage and prevent relative rotation of the turbine housing and the nozzle ring. Also provided is a method of manufacturing a turbine housing, assembly for use in a turbocharger, or a turbocharger.

17 Claims, 16 Drawing Sheets

(56) References Cited

U.S. PATENT DOCUMENTS

| | | | | |
|---|---|---|---|---|
| 10,006,354 | B2 * | 6/2018 | Kindl | F01D 9/026 |
| 10,227,889 | B2 * | 3/2019 | Arnold | F02C 6/12 |
| 2004/0109755 | A1 | 6/2004 | Meier | |
| 2015/0300243 | A1 * | 10/2015 | Myers | F01D 17/105<br>60/602 |
| 2020/0024988 | A1 * | 1/2020 | Comeau | F01D 9/026 |
| 2020/0300161 | A1 * | 9/2020 | Rost | F04D 29/023 |

FOREIGN PATENT DOCUMENTS

| | | | |
|---|---|---|---|
| WO | 2008139130 | A1 | 11/2008 |
| WO | 2009076062 | A2 | 6/2009 |

OTHER PUBLICATIONS

International Search Report and Written Opinion for International patent application No. PCT/EP2021/071496. filed Jul. 30, 2021, mailed Oct. 25, 2021.

* cited by examiner

TURBINE HOUSING

CROSS-REFERENCE TO RELATED APPLICATIONS

This application claims priority to International Patent Application No. PCT/EP2021/071496, filed Jul. 30, 2021, which claims priority to GB Patent Application No. 2011956.6, filed Jul. 31, 2020 the disclosures of which are hereby expressly incorporated by reference in their entirety.

TECHNICAL FIELD

The present disclosure relates to turbine housings with extended tongue features acting as both an anti-rotation device and providing improved aerodynamic performance through optimised profile machining. The present disclosure also relates to nozzle rings and assemblies for use in turbomachines, as well as turbomachines including such turbine housings, nozzle rings, or assemblies. The present disclosure also relates to method of manufacturing such apparatuses.

BACKGROUND

Turbochargers are well-known devices for supplying air to the intake of an internal combustion engine at pressures above atmospheric pressure (boost pressure). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the inlet manifold of the engine, thereby increasing engine power. The turbocharger shaft is conventionally supported by journal and thrust bearings, including appropriate lubricating systems, located within a central bearing housing connected between the turbine and compressor wheel housing.

In known turbochargers, the turbine stage comprises a turbine chamber within which the turbine wheel is mounted; an annular inlet passageway defined between facing radial walls arranged around the turbine chamber; an inlet volute arranged around the inlet passageway; and an outlet passageway extending from the turbine chamber. The passageways and chambers communicate such that pressurised exhaust gas admitted to the inlet volute flows through the inlet passageway to the outlet passageway via the turbine and rotates the turbine wheel.

It is known to improve turbine performance by providing vanes, referred to as nozzle vanes, in the inlet passageway so as to deflect gas flowing through the inlet passageway towards the direction of rotation of the turbine wheel. Each vane is generally laminar, and is positioned with one radially outer surface arranged to oppose the motion of the exhaust gas within the inlet passageway, i.e. the circumferential component of the motion of the exhaust gas in the inlet passageway is such as to direct the exhaust gas against the outer surface of the vane. The nozzle vanes are generally provided on a nozzle ring.

Turbines may be of a fixed or variable geometry type. Variable geometry type turbines differ from fixed geometry turbines in that the geometry of the inlet passageway can be varied to optimise gas flow velocities over a range of mass flow rates so that the power output of the turbine can be varied to suit varying engine demands. For instance, when the volume of exhaust gas being delivered to the turbine is relatively low, the velocity of the gas reaching the turbine wheel is maintained at a level that ensures efficient turbine operation by reducing the size of the inlet passageway.

In one known type of variable geometry turbine, an axially moveable wall member, generally referred to as a "nozzle ring", defines one wall of the inlet passageway. The position of the nozzle ring relative to a facing wall of the inlet passageway is adjustable to control the axial width of the inlet passageway. Thus, for example, as gas flowing through the turbine decreases, the inlet passageway width may also be decreased to maintain gas velocity and to optimise turbine output. Such nozzle rings comprise a generally annular wall and inner and outer axially extending flanges. The flanges extend into a cavity defined in the turbine housing, which is a part of the housing that in practice is provided by the bearing housing, which accommodates axial movement of the nozzle ring.

In contrast to a variable geometry turbine, in a fixed geometry turbine the relative position of the nozzle ring to the facing wall is fixed.

SUMMARY

The present disclosure aims to provide new and useful assemblies for use in a turbomachine, as well as new and useful turbo-machines, especially turbo-chargers, incorporating such assemblies.

In general terms, the present disclosure proposes that the nozzle ring and the turbine housing are provided with a complementary tongue and slot which are configured to engage with one another and to thereby prevent relative rotation of the nozzle ring and the turbine housing. The tongue may be in the form of a vane or a portion of a vane. The slot is located in a position where it is desirable to have a vane or is adjacent a complementary portion of a vane such that when the tongue engages with the slot, a vane is provided in a desired location. The tongue can be shaped to have the optimal desired geometry for gas flow. The slot may also be referred to as a cut-out. The slot, also known as a cut-out, is configured to engage with a complementary protrusion, referred to as a tongue, in order to restrict relative rotation of the turbine housing and nozzle ring.

As such, according to a first aspect of the present disclosure, there is provided an assembly for a turbocharger, the assembly comprising a turbine housing and a nozzle ring, wherein one of the turbine housing and the nozzle ring comprises a tongue and the other of the turbine housing and the nozzle ring comprises a corresponding slot or cut-out, the tongue and slot or cut-out being configured to engage and prevent relative rotation of the turbine housing and the nozzle ring.

In use, exhaust gas is incident on the vanes of the nozzle ring and this imparts a rotational force on the nozzle ring. In previous assemblies, the nozzle ring is fixedly attached to the turbine housing by way of rivets or welding. However, these attachment methods require additional assembly steps as well as additional parts, whereas the present disclosure allows for more efficient assembly and the use of fewer parts. The engagement of the tongue and the slot prevents or substantially prevents the nozzle ring from rotating relative to the turbine housing. Of course, there may be some slight movement due to manufacturing tolerances, but such rotation is limited by the engagement of the tongue and the slot. The tongue is in the form of a protrusion which engages with a surface of the complementary cut-out. The tongue and the slot or cut-out are configured to form a vane when in the assembled condition. A vane portion may be provided adjacent the slot or cut-out, the vane portion being configured to engage with the tongue in the assembled condition to form a vane.

The tongue may be located on either the turbine housing or the nozzle ring. Consequently, the slot or cut-out may be located on the other of the turbine housing or the nozzle ring. Preferably the turbine housing comprises the tongue and the nozzle ring comprises the slot or cut-out.

The tongue may extend radially inwardly from a surface of the turbine housing. The tongue may be integrally formed with the turbine housing. This allows the tongue to be provided without any additional requirement to attach it to the turbine housing. Alternatively, the tongue may be a separately formed insert. In such embodiments, the turbine housing and the tongue may have complementary mating features which retain the tongue in the turbine housing. Such mating features may comprise a push fit connection. By providing the tongue as a separate element, it is possible to easily alter the select of the tongue insert to interact favourably with the vanes on a corresponding nozzle ring.

The nozzle ring may have an outer circumference and an inner circumference, and the slot or cut-out may extend radially inwardly from the outer circumference towards the inner circumference. In other embodiments, the slot or cut-out may extend from the inner circumference to the outer circumference. It will be appreciated that the slot or cut-out does not necessarily have to extend normal to the circumference and may instead be angled. It will also be appreciated that the slot or cut-out does not necessarily need to define an area which is closed off on three sides or more. The slot or cut-out can be u-shaped or can be v-shaped.

The nozzle ring may comprise a plurality of vanes. The slot or cut-out may be positioned on the nozzle ring adjacent to a vane portion, preferably radially adjacent. In embodiments, the plurality of vanes are evenly distributed around the nozzle ring. Since it is desired in embodiments for the tongue portion to form at least part of one of the vanes when in the assembled condition, the slot or cut-out is positioned adjacent to a vane portion. That is to say that the slot is positioned between two vanes where a vane would otherwise have been present. By vane portion it is meant that the radially inner portion of a vane is provided and the slot or cut-out is located at the position of where the radially outer portion of the vane would have otherwise been located. As such, when the tongue engages with the slot or cut-out, it forms a complete vane composed of the vane portion disposed on the nozzle ring and the tongue portion disposed on the turbine housing. It will be appreciated that the reverse may also be the case, that is where the vane portion comprise a radially outer portion of a vane and the slot or cut-out is located at the position where the radially inner portion of the vane would otherwise have been located.

The tongue may comprise at least a portion with a geometry substantially corresponding to the vanes of the nozzle ring. As it is desired for the tongue of embodiments of the present disclosure to form at least part of one of the vanes on the nozzle ring, it preferably has substantially the same geometry as the remainder of the vanes on the nozzle ring. The vanes on the nozzle ring which are not at least partially formed from the tongue are generally fully disposed between the inner circumference of the nozzle ring and the outer circumference of the nozzle ring. Since the tongue extends from the turbine housing, the radially outer portion may extend beyond the outer circumference of the nozzle ring and so the overall shape of the tongue may slightly differ from that of the other vanes on the nozzle ring. However, the portion of the tongue which extends in the same relative position of the other vane members on the nozzle ring has substantially the same geometry as such other vanes.

The slot or cut-out may be positioned on the nozzle ring such that in an assembled configuration, the tongue forms a vane with a corresponding vane portion on the nozzle ring. In this way, the anti-rotation device serves a dual function of preventing relative rotation of the nozzle ring with respect to the turbine housing and also forms a part of the aerodynamic features of the nozzle ring. Therefore, the present disclosure provides advantageous aerodynamic performance whilst allowing more efficiently assembly of the apparatus and whilst also requiring fewer parts.

The tongue may be a cast feature. The tongue may be cast alongside the remainder of the turbine housing. As such, the tongue may be an integral or one-piece feature of the turbine housing. By casting the tongue as part of the turbine housing, there are no additional steps required to attach the tongue to the housing. This provides for easier manufacture of the turbine housing having the tongue feature. After casting, the cast tongue portion may be machined, such as by milling, into the desired aerodynamic shape. This is since the tongue will form at least part of a vane to redirect the flow of exhaust gas in the desired direction when in the assembled configuration and then in use. In other embodiments, the tongue is a separately formed insert. By providing the tongue as a separate element, it may be possible to more readily provide tongue elements having a range of different geometries which may be selected depending on the nature of the vanes on the corresponding nozzle ring. Thus, a single turbine housing could be used in conjunction with nozzle rings having different vane geometries, but simply selecting the appropriate tongue element for engagement with the turbine housing.

The assembly may comprise two or more tongues and slots or cut-outs. Whilst a single tongue/slot or cut-out pairing may be sufficient, it is also contemplated that there may be multiple tongue/slot or cut-out pairings as required. Any suitable number may be provided. Where there are multiple tongue/slot or cut-out pairings, they are preferably evenly distributed around the turbine housing/nozzle ring. The tongues may be provided as integral elements and/or as separately formed elements.

The tongue may include a sealing surface. The slot may include a sealing surface. The sealing surface of the tongue may be configured to engage with the corresponding sealing surface of the slot or cut-out to form a seal along substantially the entire length of the portions of the sealing surfaces which overlap with one another. Since the interface between the two sealing surfaces is a potential area for leakage of gases, and therefore a loss of efficiency, the tongue and the slot or cut-out preferably form a seal. In cases where the tongue and the slot or cut-out meet one another at a point, there is a greater chance that gas will be able to leak past. In addition, there is likely to be greater wear at that point due to the small surface area. In contrast, by providing complementary sealing surfaces on the tongue and the slot or cut-out, the risk of leakage of gas is reduced and wear is also reduced. As such, the tongue may be conformal with the slot or cut-out when mated. The sealing surface of the tongue may be conformal with the sealing surface of the slot or cut-out when mated. In embodiments, the tongue may comprise a mating surface, preferably a planar mating surface. The mating surface is configured to engage with a corresponding mating surface associated with the slot or cut-out. The mating surface may be planar, but in embodiments may be partially convex and/or concave.

According to a second aspect of the present disclosure, there is provided a turbine housing including a radially inwardly extending tongue configured to engage with a corresponding slot or cut-out in a nozzle ring to prevent relative rotation between the turbine housing and the nozzle ring.

The tongue may have the geometry of a portion of a vane such that in an assembled condition, the tongue forms at least a portion of a vane with a corresponding vane portion on the nozzle ring.

According to a third aspect of the present disclosure, there is provided a nozzle ring for a turbomachine, said nozzle ring including a slot or cut-out extending inwardly from an outer circumference of the ring, said slot or cut-out being configured to engage with a tongue of a turbine housing when in an assembled condition.

The slot or cut-out may be positioned at least partially radially outboard of a vane portion such that in an assembled condition, a tongue of a turbine housing engages with the slot or cut-out and forms a vane with the vane portion. It will be appreciated that, in all aspects of the present disclosure, the slot or cut-out may extend in a circumferential direction as well as in a radial direction, such that the slot or cut-out is angled with respect to a radial direction and, in examples, an exclusively radial direction.

The slot or cut-out may be positioned radially outboard of a vane portion such that, in an assembled condition, a tongue of a turbine housing engages with the slot or cut-out and forms a vane with the vane portion.

As such, the turbine housing of the second aspect of the present disclosure may combine with the nozzle ring according to the third aspect of the present disclosure to form an assembly according to the first aspect of the present disclosure.

According to a fourth aspect of the present disclosure, there is provided a turbine assembly comprising a turbine wheel and a turbine housing according to the first or second aspect of the present disclosure. Alternatively or additionally, there is provided a turbine assembly comprising a turbine wheel and a nozzle ring according to the first or third aspect of the present disclosure. In embodiments, there is provided a turbine assembly comprising a turbine wheel and a turbine housing and a nozzle ring according to any of the first to third aspects of the present disclosure. The turbine assembly may be of a fixed or variable type geometry.

According to a fifth aspect of the present disclosure, there is provided a turbocharger comprising a turbine assembly according to the fourth aspect of the present disclosure.

According to a sixth aspect of the present disclosure, there is provided a method of manufacturing a turbine housing according to any other aspect of the present disclosure, wherein said method includes casting a turbine housing having a tongue extending radially inwardly, and machining, preferably milling, the tongue to have a geometry substantially corresponding to the geometry of a vane of a nozzle ring. Alternatively, the method may comprise providing a turbine housing having a mating feature configured to receive a separately formed tongue portion, and engaging a separately formed tongue portion with the mating feature.

The turbine housing according to the second aspect of the present disclosure may be the turbine housing of the assembly of claim 1. As such, all features describing the first or second aspects of the present disclosure equally apply to the other of the first and second aspects of the present disclosure.

It will be appreciated that where appropriate any of the above aspects may incorporate one or more features of any of the other aspects.

BRIEF DESCRIPTION OF THE FIGURES

Embodiments of the disclosure will now be described, by way of example only, with reference to the accompanying drawings, of which.

Figure 8:
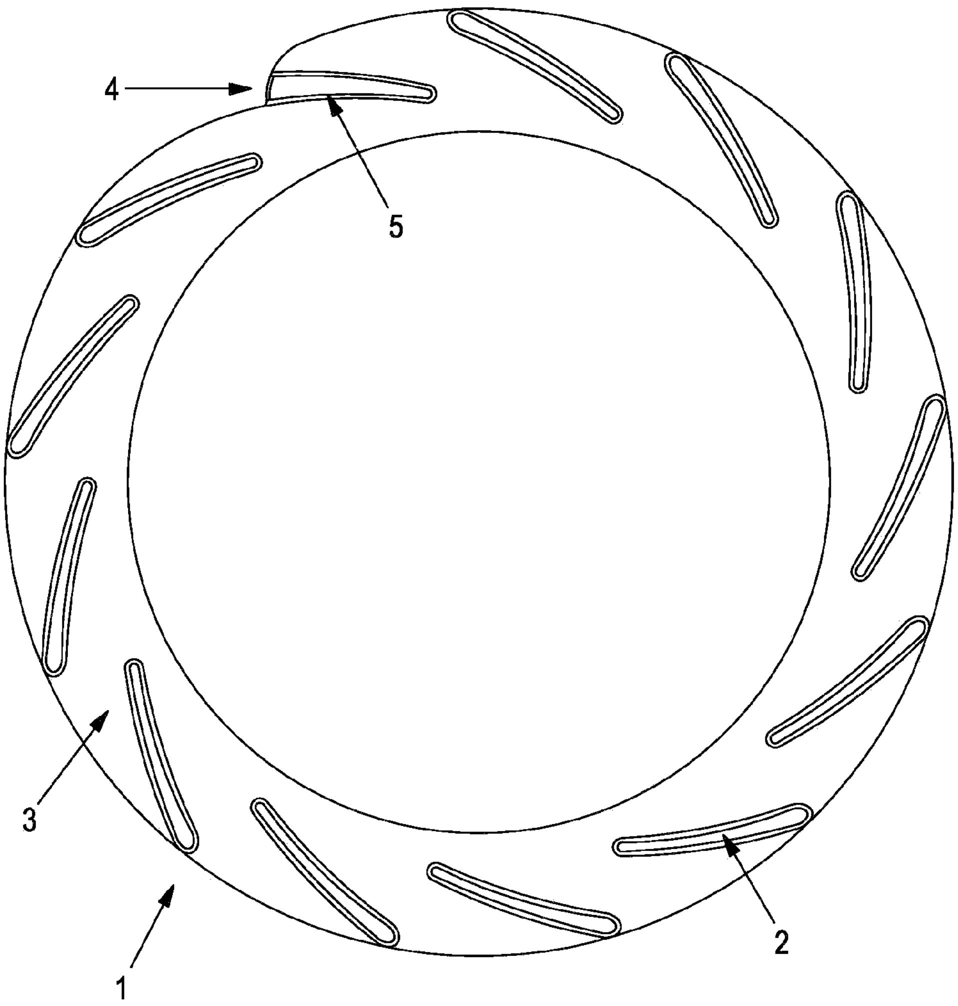
Figure 9:
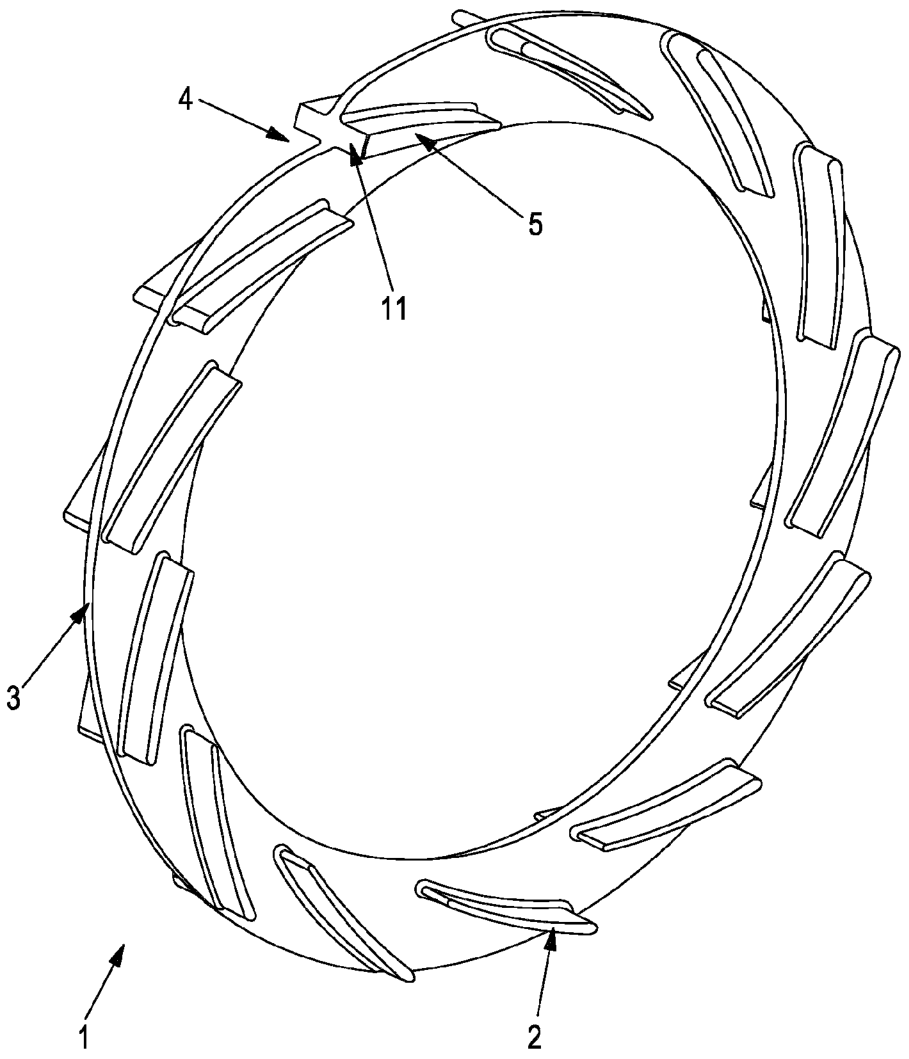
Figure 10:
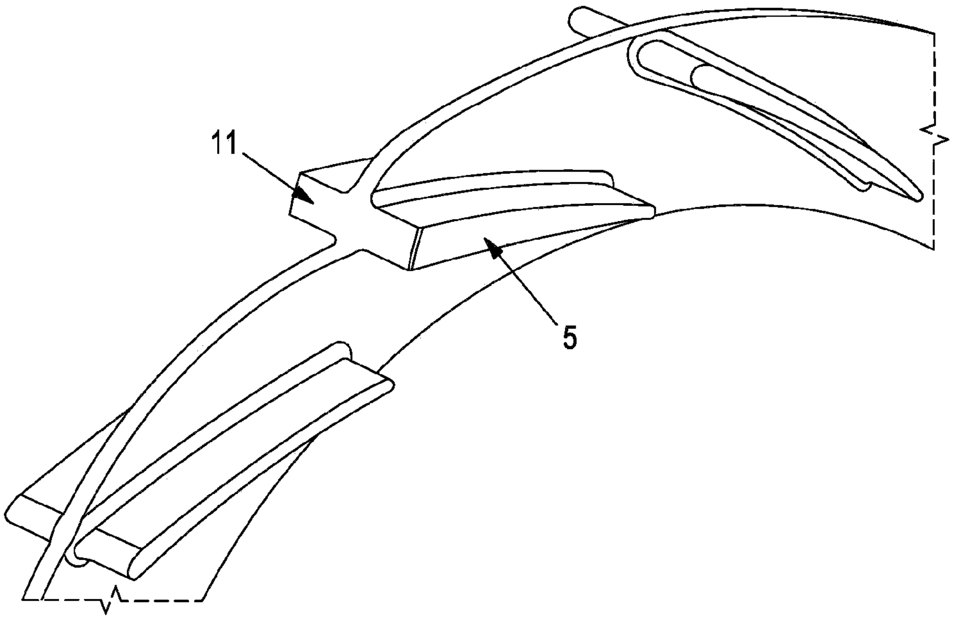
Figure 11:
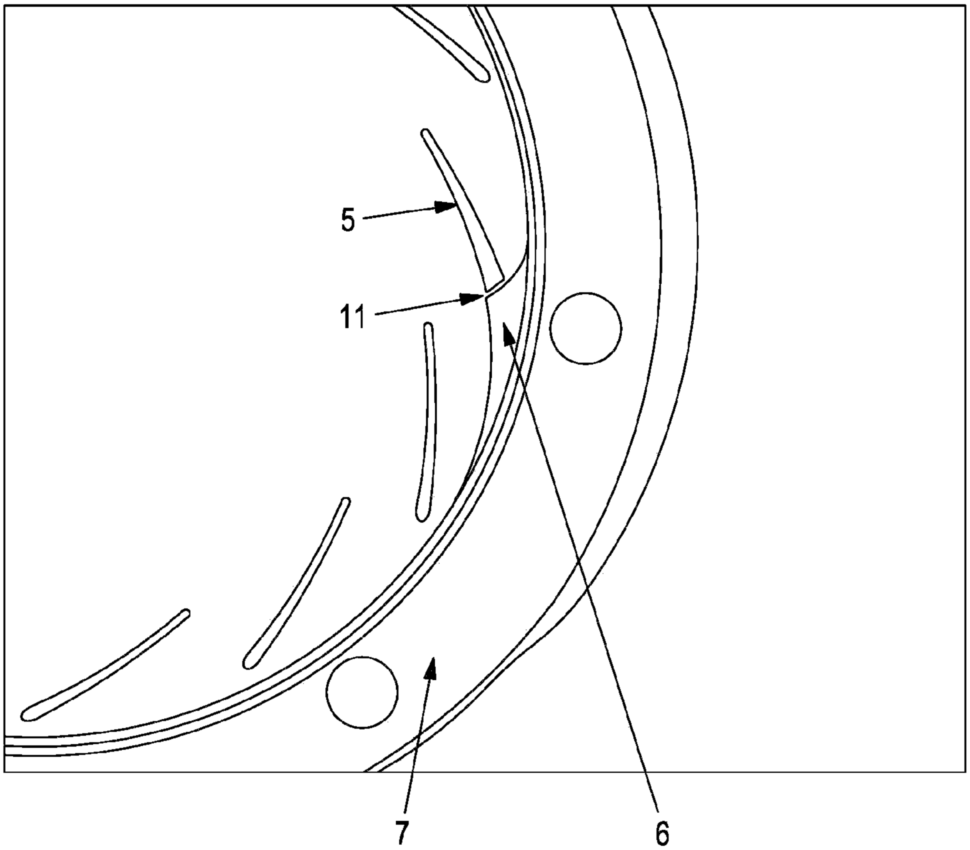
Figure 12:
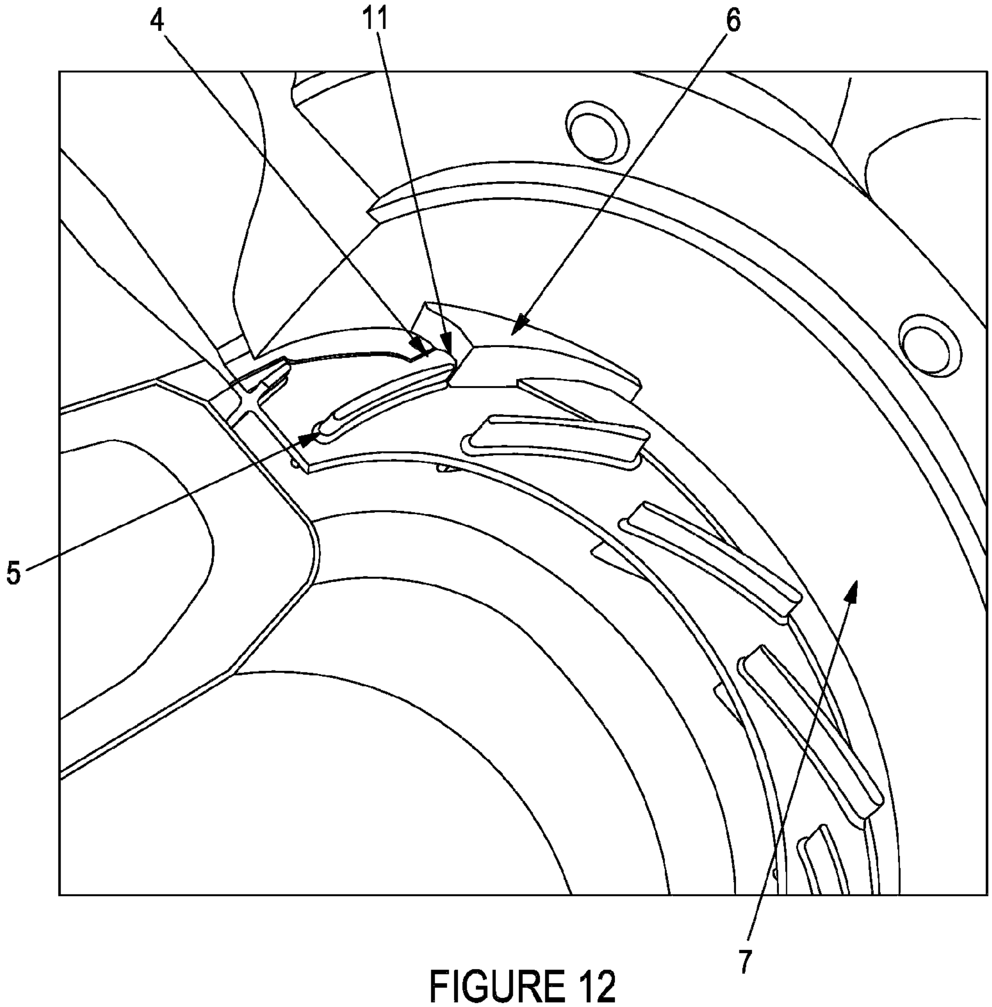
Figure 13:
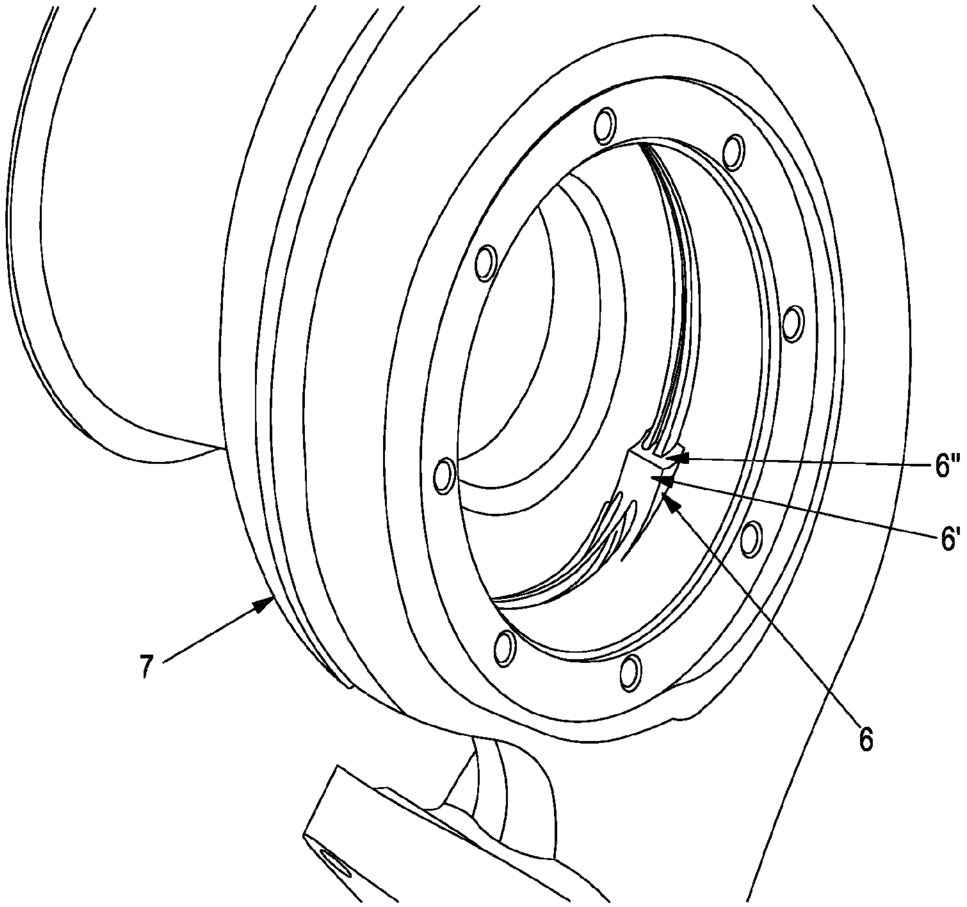

FIGS. *6a* and *6b* depicts a turbine housing having a receiving portion for a separately formed tongue portion;

FIGS. *7a* and *7b* schematically depict non-optimised nozzle and slot geometries, and FIG. *7c* depicts optimised nozzle and tongue geometries forming an improved gas seal and reducing wear rate in accordance with an embodiment of the present disclosure;

FIG. 8 depicts a nozzle ring in accordance with the present disclosure;

FIG. 9 depicts another view of the nozzle ring of FIG. 8;

FIG. 10 is an enlarged version of the slot or cut-out of the nozzle ring of FIGS. 8 and 9;

FIGS. 11 and 12 depict the engagement of the nozzle ring with the turbine housing;

FIG. 13 depicts a turbine housing according to the present disclosure; and

Figure 14:
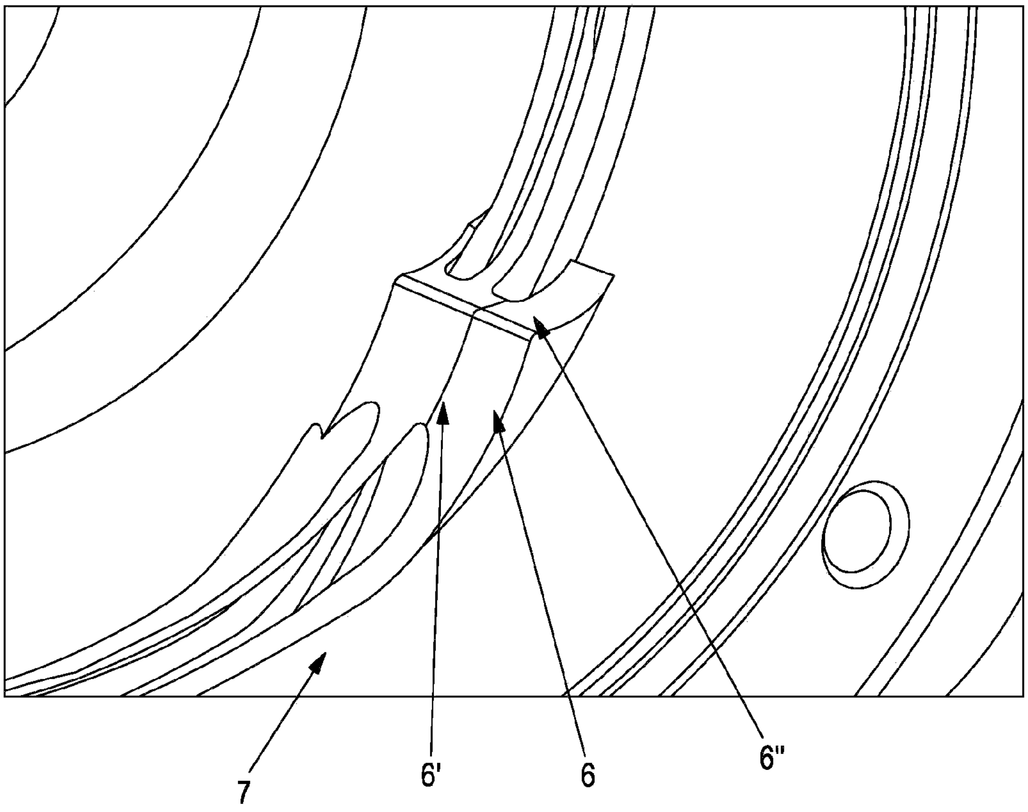

FIG. 14 is an enlarged version of the tongue positioned on the turbine housing.

DETAILED DESCRIPTION

Figure 1:
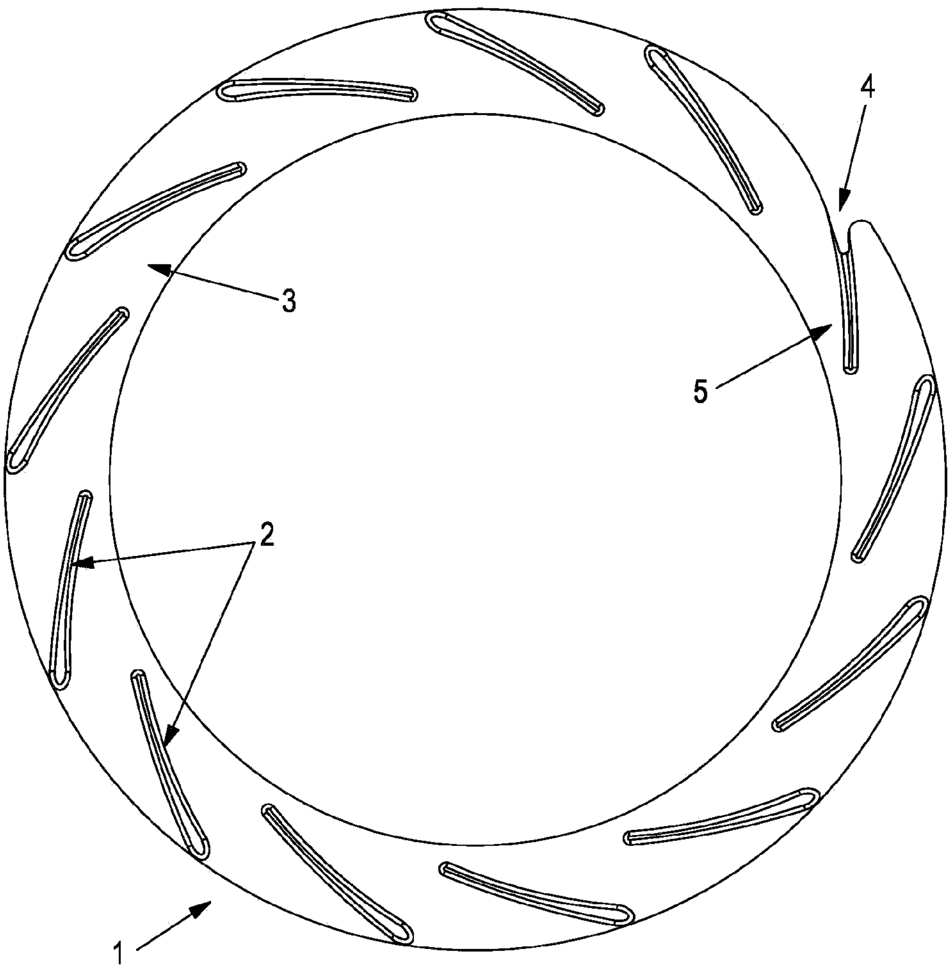
FIG. 1 depicts a nozzle ring in accordance with an embodiment of the present disclosure.

FIG. 1 shows a nozzle ring 1 for use in a turbine assembly of a turbomachine, preferably a turbocharger for an internal combustion vehicle. The nozzle ring 1 comprises a plurality of vanes 2 (only two of which are numbered). The vanes 2 are radially distributed and are disposed on a common ring 3. The vanes 2 are shaped and configured in a known manner. The present disclosure is not particularly limited by the shape and configuration of the vanes 2. It will be appreciated that the disclosure is also not particularly limited to the number of vanes depicted. The nozzle ring 1 includes a slot 4, also referred to as a cut-out. Only a single slot 4 is shown, but it will be appreciated that there may be more than one slot 4 provided in embodiments. The slot 4 extends radially inwardly from an outer circumference of the nozzle ring 1 towards an inner circumference of the nozzle ring 1. As depicted, the slot 4 does not extend in a purely radial direction and also extends in a circumferential direction. In this way, the slot 4 is angled with respect to the radius of the nozzle ring 1. The slot 4 is adjacent to a vane portion 5. As such, the radially innermost portion of slot 4 terminates adjacent vane portion 5. The slot 4 is configured to engage with a tongue 6 on the turbine housing 7. In embodiments, when the tongue is received within the slot 4, the tongue 6 and the vane portion 5 together form a vane which has substantially the same geometry as the other vanes 2 provided on the nozzle ring 1. As such, the vane portion 5 and the tongue 6 are shaped to form a smooth transition from the tongue 6 to the vane portion 5. It will therefore be appreciated that in the assembled condition where the tongue 6 is engaged in the slot 4, a vane is formed that is substantially the same as the other vanes 2 on the nozzle ring 1. In the depicted embodiment of FIG. 1, the vane portion 5 is approximately 50% of the length of the other vanes 2. It will be appreciated that the vane portion 5 can be made longer or shorter than as depicted and the tongue 6 will correspondingly be made shorter or longer as required.

Figure 2:
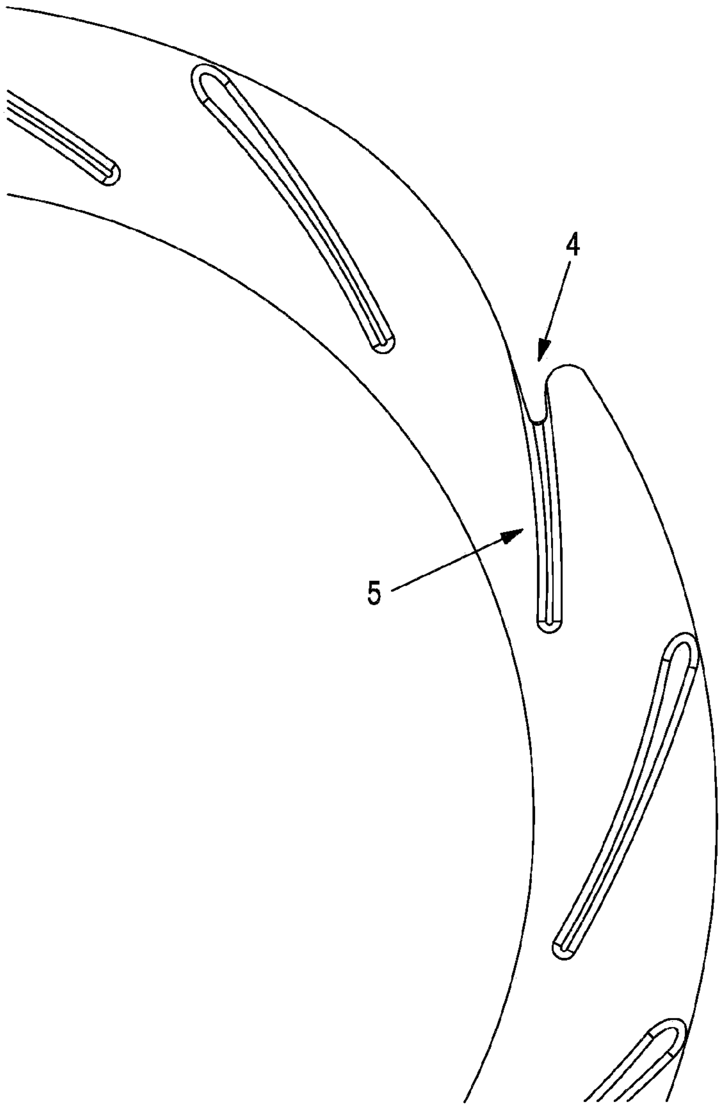
FIG. 2 provides a larger view of a portion of a nozzle ring in accordance with an embodiment of the present disclosure.

FIG. 2 provides a larger view of the slot 4 and the vane portion 5. As depicted, the slot 4 is shaped as an extension to the vane portion 5. The slot 4 smoothly engages with the vane portion 5. As such, when the tongue 6 is mated with the slot, the vane portion 5 and the tongue 6 form a smooth transition.

Figure 3:
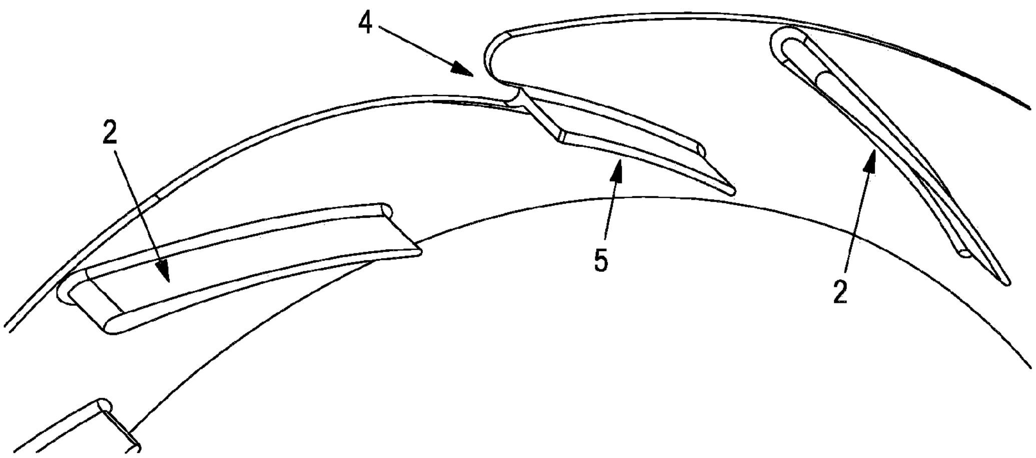
FIG. 3 provides a perspective view of a nozzle ring in accordance with an embodiment of the present disclosure.

FIG. 3 provides a perspective view of the slot 4 and vane portion 5. In order to form a smooth transition, the tongue 6 may extend to substantially the same height as the vane portion 5.

Figure 4:
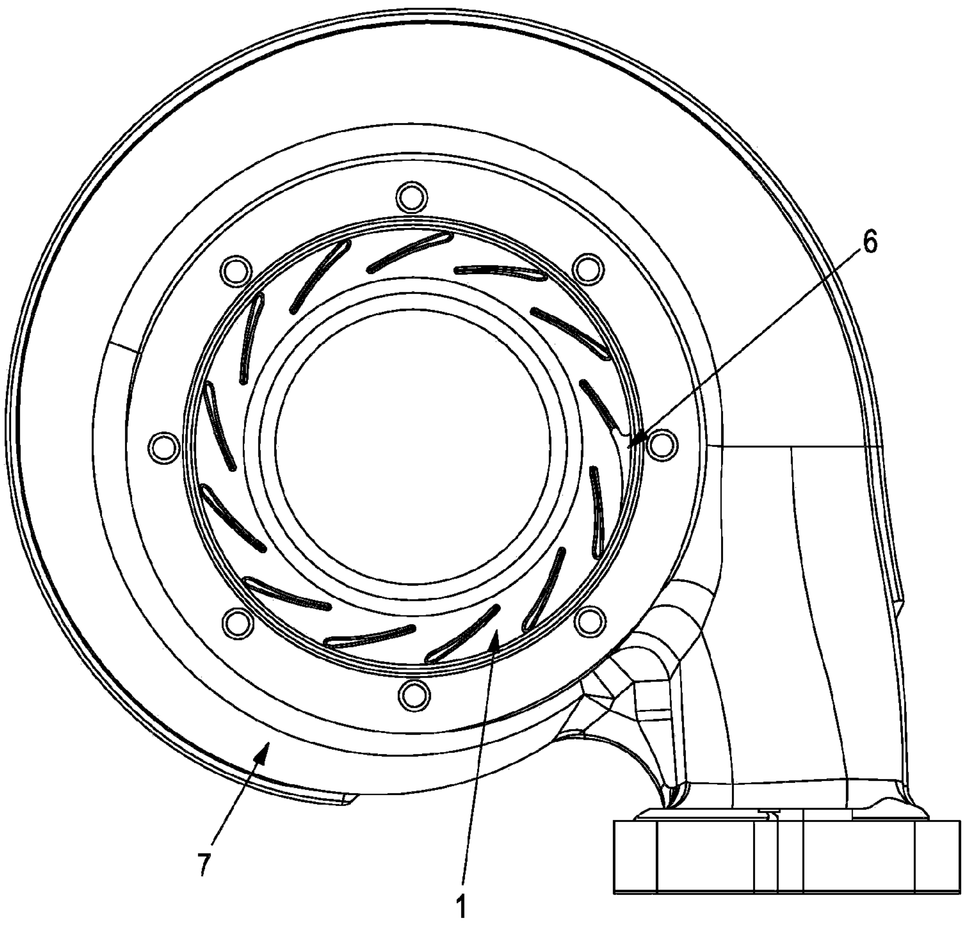
FIG. 4 depicts a nozzle ring and a turbine housing both according to the present disclosure in the assembled position to form an assembly according to the present disclosure.

FIG. 4 depicts a turbine housing 7 and a nozzle ring 1 in an assembled condition. The turbine housing 7 includes a tongue 6. The tongue extends inwardly from an inner surface of the turbine housing 7. The tongue 6 engages with the complementary slot 4 in the nozzle ring to prevent relative rotation of the nozzle ring 1 with respect to the turbine housing 7. The tongue 6 is shaped to provide optimal aerodynamic performance.

Figure 5:
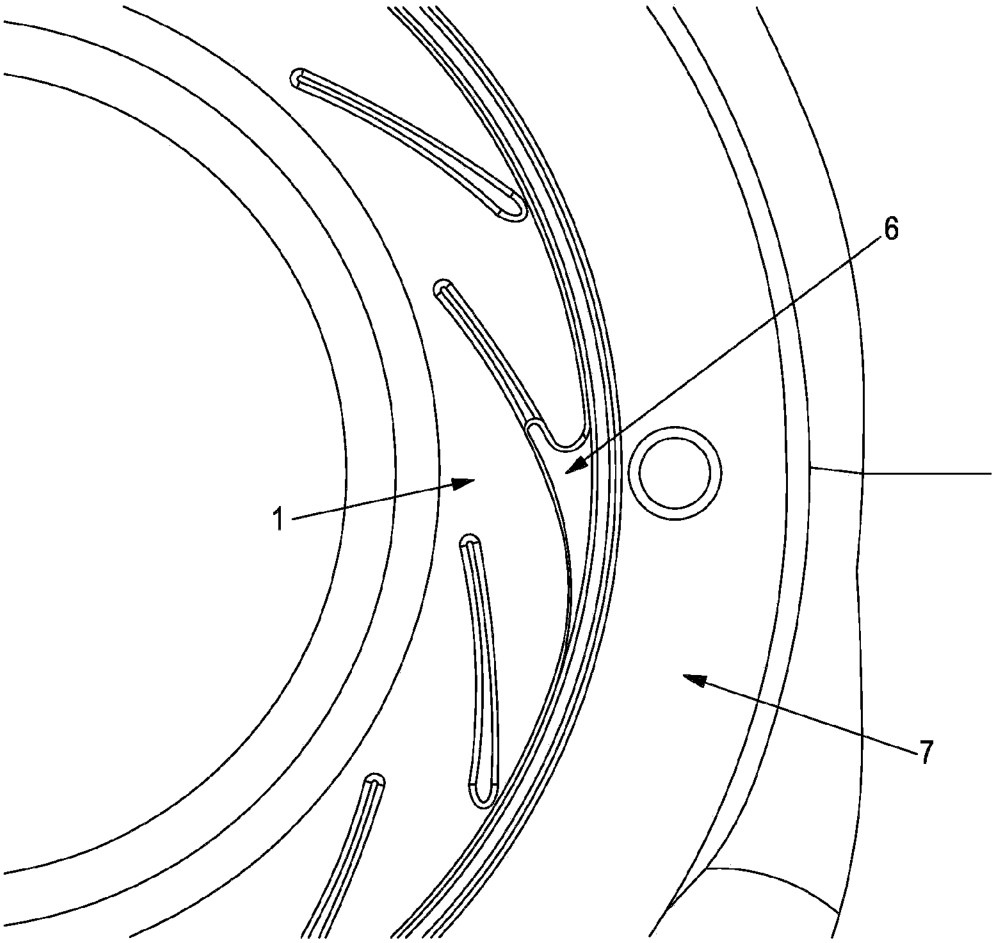
FIG. 5 provides a larger view of a nozzle ring and a turbine housing mated via a tongue and slot.

FIG. 5 provides a larger version of the portion of FIG. 4 showing the engagement of the tongue 6 with the slot of the nozzle ring 1.

Figure 6A:
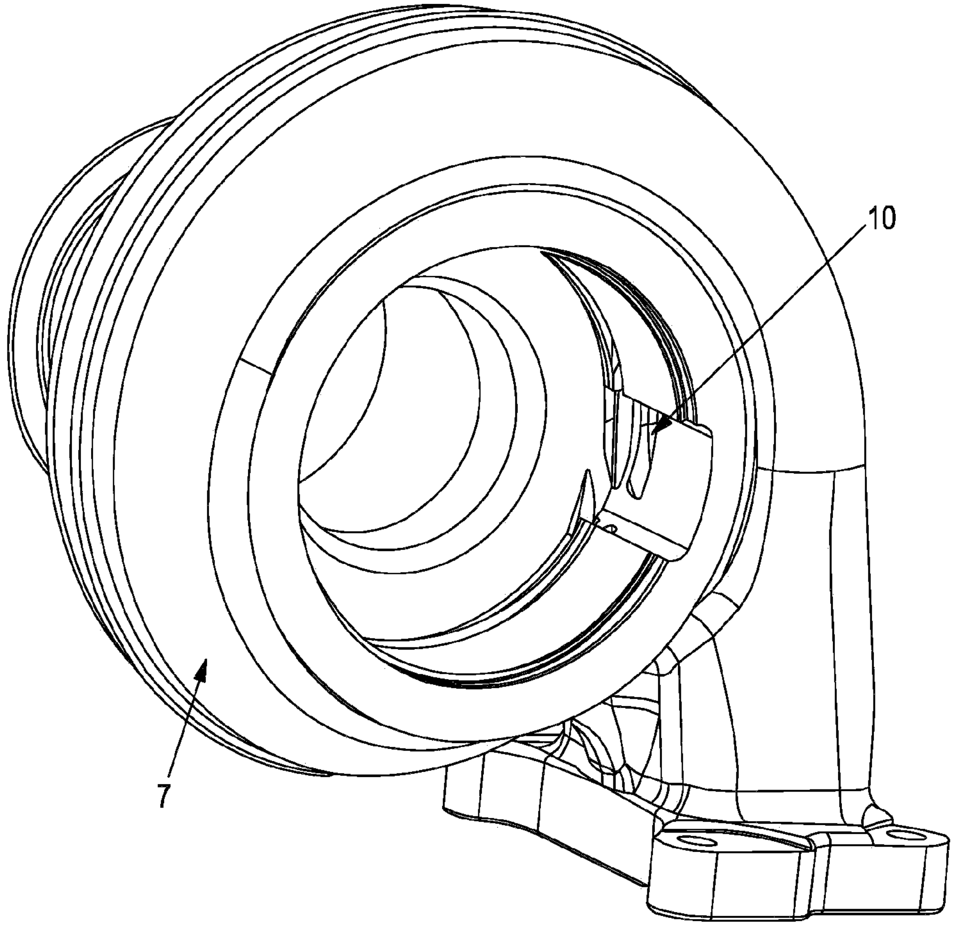
Figure 6B:
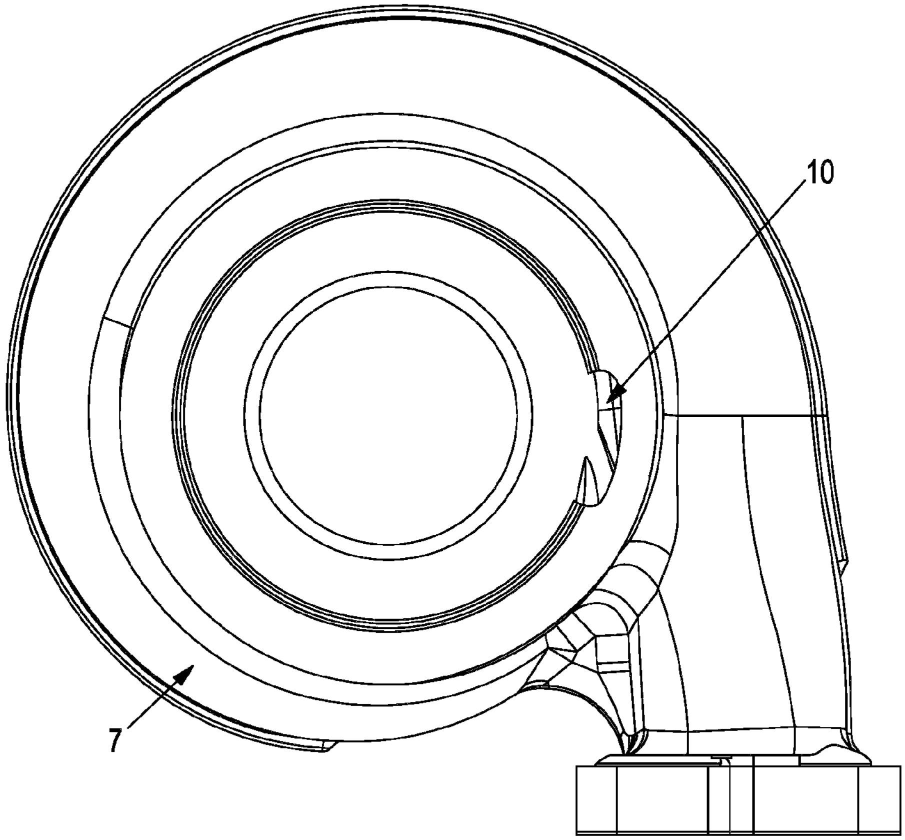

FIGS. 6*a* and 6*b* depict a turbine housing 7 having a mating portion 10 which is configured to receive a tongue portion. In embodiments in which the tongue is separately formed from the turbine housing, the turbine housing 7 is provided with a mating portion 10 to allow the tongue 6 to be mated with the turbine housing 7. The exact shape and position of the mating portion 10 will depend on the shape and desired position of the tongue 6. As such, the mating portion 10 need not necessarily be disposed or shaped as depicted.

Figure 7A:
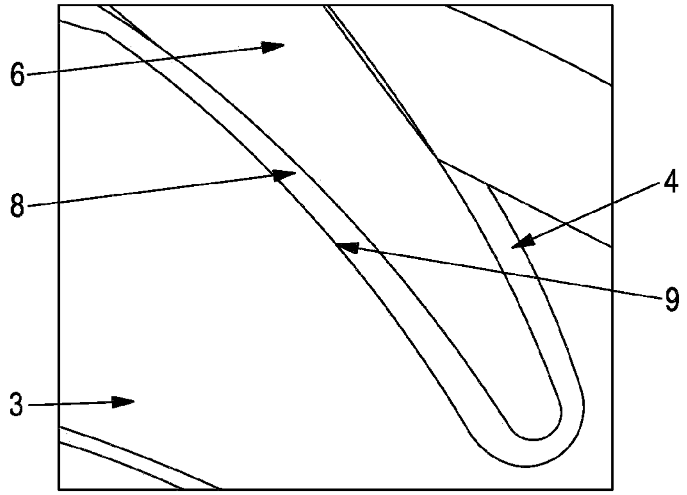
Figure 7B:
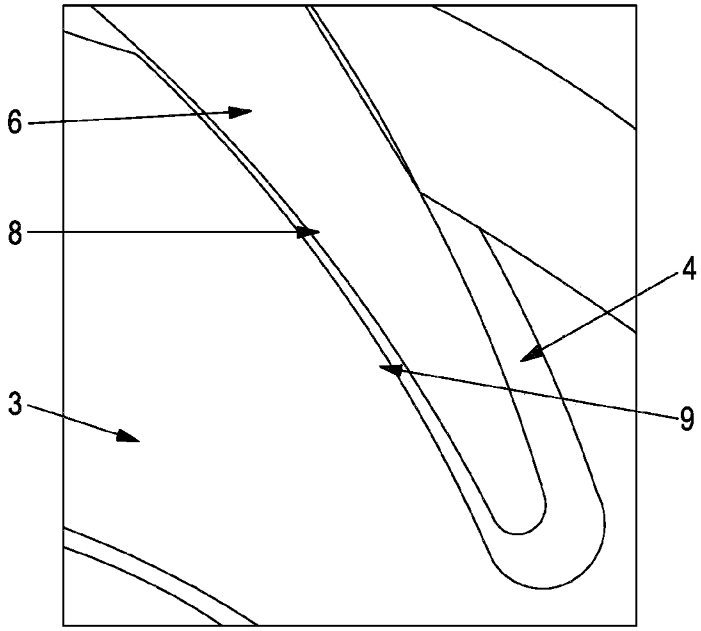
Figure 7C:
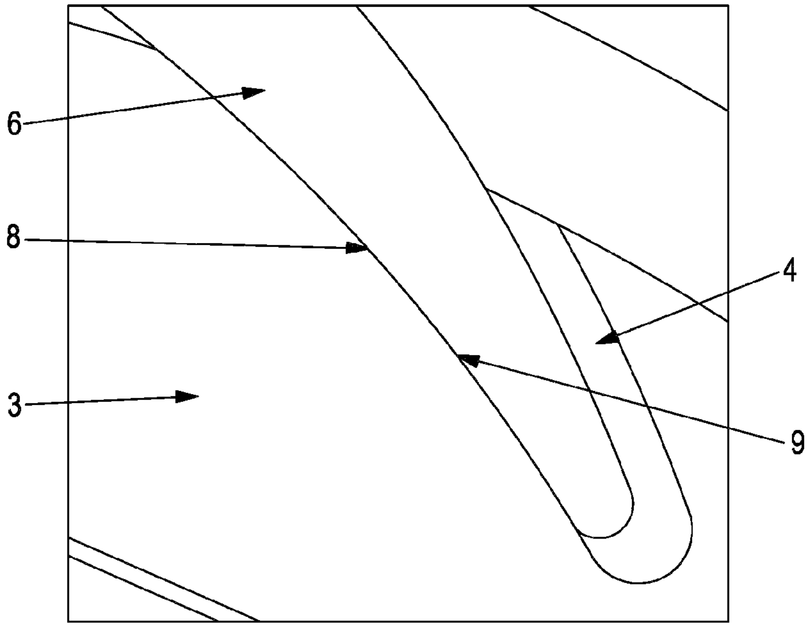

FIGS. 7*a* to 7*c* depict nozzle and tongue geometries forming gas seals. In particular, FIG. 7*a* depicts a tongue 6 being located within slot 4. Due to required tolerances, there is a gap between the edges of the slot 4 and the tongue 6. The tongue 6 includes a tongue sealing surface 8 and the slot includes a slot sealing surface 9.

FIG. 7*b* depicts the case in which the geometry of the tongue sealing surface 8 and the slot sealing surface 9 are not configured to form a seal which extends substantially along the entirety of the overlapping portions of the tongue sealing surface 8 and the slot sealing surface 9, namely the sealing surfaces are not conformal. In the case depicted in FIG. 7*b*, there is a point contact at the radially outer portion where the tongue sealing surface 8 and the slot sealing surface 9 meet. Radially inwardly of this, there is a gap between the sealing surfaces 8, 9. During operation of the turbine, the nozzle vanes experience slight rotation due to the gas forces acting upon them. If the slot and/or tongue geometry are not optimised with respect to the static tongue 6, then an unfavourable point contact is produced. This results in a gap through which exhaust gases can leak and is therefore accompanied by a loss in performance. In addition, the small contact area give rise to rapid material wear.

FIG. 7*c* depicts an embodiment of the present disclosure in which the tongue 6 and the slot 4 have geometries which are configured to provide a full surface seal when the turbine is in operation, namely the sealing surfaces of the tongue 6 and slot 4 are conformal. As such, when the exhaust gases act upon the vanes of the nozzle ring 1, the nozzle ring 1 undergoes a small degree of rotation until the tongue sealing surface 8 engages with the slot sealing surface 9. Since the outer portion of the nozzle ring 1 moves by a relatively greater distance than an inner portion of the nozzle ring 1 (since both move through the same degree of rotation, but the outer portion is at a greater distance away from the centre of rotation), the slot sealing surface 9 is shaped to take account of this difference. Since the sealing surfaces 8, 9 are configured to provide a seal across substantially the entirety of the overlapping portions of the surfaces 8, 9, a seal is produced which has less leakage and consequent loss of power, and also shows a reduced wear rate due to the larger area of contact.

FIG. 8 depicts another embodiment according to the present disclosure, similar to that depicted in FIG. 1. The nozzle ring 1 comprises a plurality of vanes 2 (only one numbered) provided on a common ring 3. The nozzle ring 1 includes a slot or cut-out 4. The slot or cut-out 4 is similar to that depicted in FIG. 1, albeit with a more open shape, and it functions in the same way. Only a single cut-out 4 is shown, but it will be appreciated that there may be further cut-outs provided in embodiments. The cut-out 4 is positioned adjacent vane portion 5. In the assembled condition, vane portion 5 form a vane in combination with a corresponding tongue (not shown) on the turbine housing (not shown). In embodiment, the shape of the vane is substantially the same as the other vanes 2, although in embodiments, it may have a different vane shape to the other vanes 2 on the nozzle ring 1.

FIG. 9 is a perspective view of the nozzle ring 1 of FIG. 8. As can be seen, the nozzle ring 1 comprises vanes 2 and vane portions 5 on both sides. This nozzle ring 1 may therefore be used on a twin-entry turbine housing 7. The cut-out 4 includes a planar mating surface 11 that is configured to engage with a corresponding surface on the turbine housing (not shown). It will be appreciated that the mating surface 11 does not necessarily have to be planar, and may be concave and/or convex. The shape of the cut-out 4 and the planar mating surface 11 allow for more precise machining of such parts, which provides improved dimensional control and a reduction in clearances. As such, when installed in a twin entry turbine housing, there is less leakage under certain engine operating conditions, which improves performance of the turbo.

FIG. 10 shows an enlarged view of the cut-out 4, the vane portion 5, and the mating surface 11. It can be seen that the cut-out 4 provides an area to receive a corresponding tongue feature located on the turbine housing when in the assembled condition.

FIG. 11 depicts a nozzle ring 1 and a turbine housing 7 in the assembled condition. Vane portion 5 is engaged with the tongue 6 via mating surface 11. The engagement of the vane portion and the tongue 6 prevents relative rotation thereof, and the vane portion 5 and tongue 6 are shaped to have a vane profile in the assembled condition. In this way, the anti-rotation features also serve as a vane.

FIG. 12 is another view of the nozzle ring 1 and the turbine housing 7 in the assembled condition. Again, it can be seen how the tongue 6 is engaged with the cut-out 4 to prevent relative rotation of the nozzle ring 1 and the turbine housing 7, and how the tongue 6 and the vane portion 5 form a vane when in the assembled condition.

FIGS. 13 and 14 depict a turbine housing 7 including a tongue 6 according to the present disclosure. In this embodiment, the tongue 6 comprises a first tongue portion 6' and a second tongue portion 6". The first tongue portion 6' is configured to form a vane when in the assembled condition with a corresponding vane portion 5 disposed on a nozzle ring 1. The second tongue portion 6" is provided with a mating surface that is complementary to a corresponding mating surface on a nozzle ring 1.

In summary, the present disclosure provides for an anti-rotation device which also serves as a vane in the assembled condition.

The invention claimed is:

1. An assembly for a turbocharger, the assembly comprising a turbine housing and a nozzle ring, wherein one of the turbine housing and the nozzle ring comprises a tongue and the other of the turbine housing and the nozzle ring comprises a corresponding slot or cut-out, the tongue and slot or cut-out being configured to engage and prevent relative rotation of the turbine housing and the nozzle ring, wherein, in an assembled condition, the tongue and the slot or cut-out are configured to form a vane.

2. The assembly according to claim 1, wherein the turbine housing comprises the tongue and the nozzle ring comprises the slot or cut-out.

3. The assembly according to claim 1, wherein the tongue extends radially inwardly from a surface of the turbine housing.

4. The assembly according to claim 1, the nozzle ring having an outer circumference and an inner circumference, wherein the slot or cut-out extends radially inwardly from the outer circumference towards the inner circumference.

5. The assembly according to claim 1, wherein the nozzle ring comprises a plurality of vanes and wherein the slot or cut-out is positioned on the nozzle ring radially adjacent to a vane portion.

6. The assembly according to claim 5, wherein the tongue comprises at least a portion with a geometry substantially corresponding to the vanes of the nozzle ring.

7. The assembly according to claim 1, wherein the slot or cut-out is positioned on the nozzle ring such that in an assembled configuration, the tongue forms a vane with a corresponding vane portion on the nozzle ring.

8. The assembly according to claim 1, wherein the tongue is a cast feature.

9. The assembly according to claim 1, wherein the tongue is a separately formed insert.

10. The assembly according to claim 1, wherein the assembly comprises two or more tongues and slots or cut-outs.

11. The assembly according to claim 1, wherein the tongue is conformal with the slot or cut-out when mated.

12. A method of forming part of the assembly of claim 1, the method including: casting a turbine housing having a tongue extending radially inwardly, and machining; the tongue to have a geometry substantially corresponding to the geometry of a vane of a nozzle ring; or providing a turbine housing having a mating feature configured to receive a separately formed tongue portion, and engaging the separately formed tongue portion with the mating feature.

13. A turbine housing including a radially inwardly extending tongue configured to engage with a corresponding slot or cut-out in a nozzle ring to prevent relative rotation between the turbine housing and the nozzle ring, wherein the tongue has a geometry of a portion of a vane such that in an assembled condition, the tongue forms at least a portion of a vane with a corresponding vane portion on the nozzle ring.

14. A turbine assembly comprising a turbine wheel and the turbine housing according to claim 13.

15. A turbocharger comprising the turbine assembly according to claim 14.

16. A method of manufacturing a turbine housing according to claim 13 the method including: casting a turbine housing having a tongue extending radially inwardly, and machining, the tongue to have a geometry substantially corresponding to the geometry of a vane of a nozzle ring; or providing a turbine housing having a mating feature configured to receive a separately formed tongue portion, and engaging the separately formed tongue portion with the mating feature.

17. A nozzle ring for a turbomachine, the nozzle ring including a slot or cut-out extending inwardly from an outer circumference of the ring, the slot or cut-out being configured to engage with a tongue of a turbine housing when in an assembled condition, wherein the slot or cut-out is positioned at least partially radially outboard of a vane portion such that in an assembled condition the tongue of a turbine housing engages with the slot or cut-out and forms a vane with the vane portion.

* * * * *